(12) United States Patent
Arakawa

(10) Patent No.: US 10,429,273 B2
(45) Date of Patent: Oct. 1, 2019

(54) DEVICE FOR MEASURING TIRE GROUND STATE

(71) Applicant: TOYO TIRE & RUBBER CO., LTD., Itami-shi, Hyogo (JP)

(72) Inventor: Koji Arakawa, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 98 days.

(21) Appl. No.: 15/835,710

(22) Filed: Dec. 8, 2017

(65) Prior Publication Data

US 2018/0164188 A1     Jun. 14, 2018

(30) Foreign Application Priority Data

Dec. 13, 2016   (JP) .................. 2016-240983

(51) Int. Cl.
| | | |
|---|---|---|
| *G01M 17/02* | (2006.01) | |
| *B60C 19/00* | (2006.01) | |
| *G01L 5/00* | (2006.01) | |
| *G01B 7/28* | (2006.01) | |

(Continued)

(52) U.S. Cl.
CPC ........... *G01M 17/022* (2013.01); *B60C 19/00* (2013.01); *B60C 25/00* (2013.01); *G01B 7/28* (2013.01); *G01L 5/00* (2013.01); *G01L 5/0038* (2013.01); *G01M 17/013* (2013.01); *B60C 2019/004* (2013.01)

(58) Field of Classification Search
CPC .. G01M 17/02; G01M 17/021; G01M 17/022; G01M 17/027; G01M 17/025; G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/40; G01M 5/0091; G01M 7/02; G01M 99/00; G01M 99/002; E01C 23/01

USPC .................................. 73/146–146.8
See application file for complete search history.

(56) References Cited

U.S. PATENT DOCUMENTS 3,290,929 A * 12/1966 Sheldon ................ G01M 99/00
                                                   73/160
2010/0263440 A1* 10/2010 Berry .................... G01M 17/02
                                                   73/146

(Continued)

FOREIGN PATENT DOCUMENTS

JP          2013-217726 A     10/2013

*Primary Examiner* — Andre J Allen
(74) *Attorney, Agent, or Firm* — Westerman, Hattori, Daniels & Adrian, LLP

(57) ABSTRACT

A device for measuring a tire ground state includes a traveling surface, a tire drive unit, a measuring sheet, a protection sheet which covers the measuring sheet, and a backward and forward tensile force application mechanism. A space conducting the protection sheet to a portion below the traveling surface is formed in at least one of a delay side and an advance side of the measuring sheet in the tire forward traveling direction on the traveling surface. The backward and forward tensile force application mechanism has a roller which is arranged within the space, and is structured such as to pull at least one end of the protection sheet fixed to the roller in the tire forward traveling direction from the below of the traveling surface by rotating the roller.

10 Claims, 7 Drawing Sheets

(51) Int. Cl.
*B60C 25/00* (2006.01)
*G01M 17/013* (2006.01)

(56) References Cited

U.S. PATENT DOCUMENTS

2018/0045610 A1* 2/2018 Okabe ................. G01M 17/022
2018/0164187 A1* 6/2018 Koike .................... B60C 19/00

* cited by examiner

DEVICE FOR MEASURING TIRE GROUND STATE

BACKGROUND OF THE INVENTION

Field of the Invention

The present invention relates to a device for measuring a tire ground state which can measure a ground surface pressure and a ground surface shape of a tire.

Description of the Related Art

As a device for measuring the tire ground surface pressure, patent document 1 discloses a device having a traveling surface, a tire drive unit which grounds the tire on the traveling surface and rolls the tire, a pressure sensor sheet which serves as a sheet for measuring, a protection sheet which covers the pressure sensor sheet, and a backward and forward tensile force application mechanism which applies a tensile force to the protection sheet in a tire forward traveling direction.

The pressure sensor sheet is strong in a direction which is perpendicular to the surface, however, is weak in shear force. In the case that a braking, a driving, a turning, a slip angle and a camber angle of the tire are set, the shear force acts on the pressure sensor sheet. Accordingly, it is necessary to protect the pressure sensor sheet with the protection sheet. In order to prevent the protection sheet from being moved by the rolling motion of the tire, the tensile force is applied to the protection sheet in the tire forward traveling direction by the backward and forward tensile force application mechanism.

PRIOR ART DOCUMENT

Patent Document

Patent Document 1: JP-A-2013-217726

SUMMARY OF THE INVENTION

It is necessary to pull the protection sheet by the backward and forward tensile force application mechanism, however, the tire travels in the forward traveling direction. Therefore, it is necessary to prevent the backward and forward tensile force application mechanism from forming an obstacle to the tire forward traveling. As a result, in the patent document 1, the protection sheet is made longer than the tire traveling surface, and the backward and forward tensile force application mechanism is arranged in an outer side than the tire traveling surface. According to this structure, the device is enlarged in the tire forward traveling direction.

The present invention is made by paying attention to the problem as mentioned above, and an object of the present invention is to provide a tire ground state measuring device which can be made compact.

In order to achieve the object mentioned above, the present invention employs the following means.

More specifically, a device for measuring a tire ground state includes:

a traveling surface;

a tire drive unit which grounds a tire on the traveling surface and rolls the tire;

a measuring sheet which is mounted to a partial area of the traveling surface and is provided for measuring the tire ground state;

a protection sheet which covers the measuring sheet; and a backward and forward tensile force application mechanism which applies a tensile force along a tire forward traveling direction to the protection sheet, a space conducting the protection sheet to a portion below the traveling surface is formed in at least one of a delay side and an advance side of the measuring sheet in the tire forward traveling direction on the traveling surface, and the backward and forward tensile force application mechanism has a roller which is arranged within the space, and is structured such as to pull at least one end of the protection sheet fixed to the roller in the tire forward traveling direction from the below of the traveling surface by rotating the roller.

As mentioned above, the space conducting the protection sheet to the portion which is below the traveling surface is formed in at least one of the delay side and the advance side of the measuring sheet in the tire forward traveling direction on the traveling surface, and the backward and forward tensile force application mechanism pulls at least one end of the protection sheet in the tire forward traveling direction from the below of the traveling surface by rotating the roller. As a result, the backward and forward tensile force application mechanism does not interfere with the traveling of the tire at any of the tire drive starting time and the tire braking time, the protection sheet can be set to the necessarily minimum length and it is possible to downsize the device.

DETAILED DESCRIPTION OF THE PREFERRED EMBODIMENTS

First Embodiment

A description will be given below of a device for measuring a tire ground state according to a first embodiment of the present invention with reference to the accompanying drawings.

Figure 1:
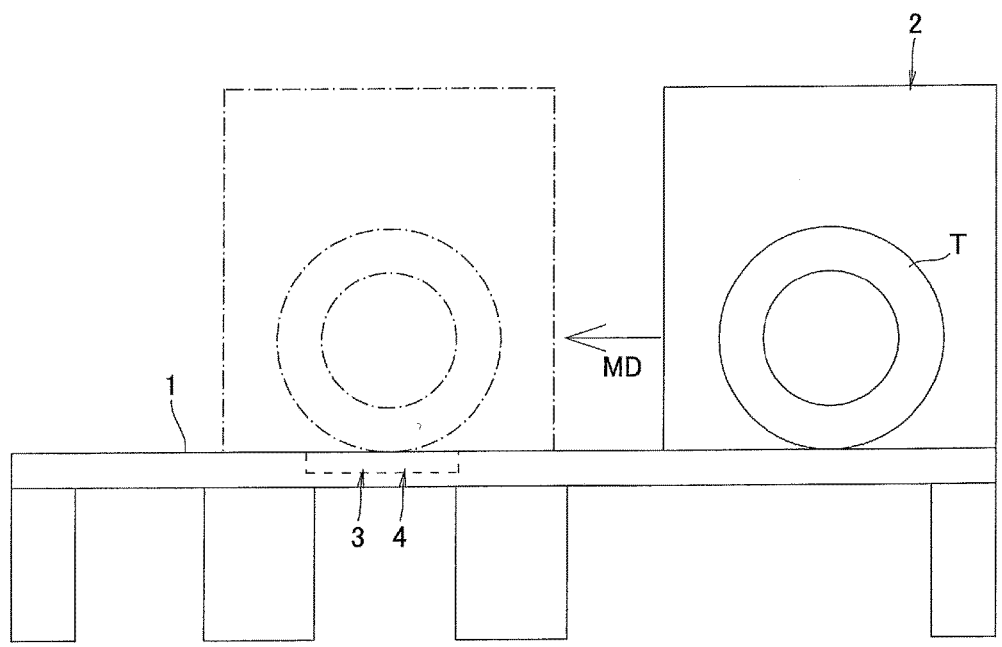
FIG. 1 is a side elevational view showing a device for measuring a tire ground state according to a first embodiment in the present invention.
Figure 2A:
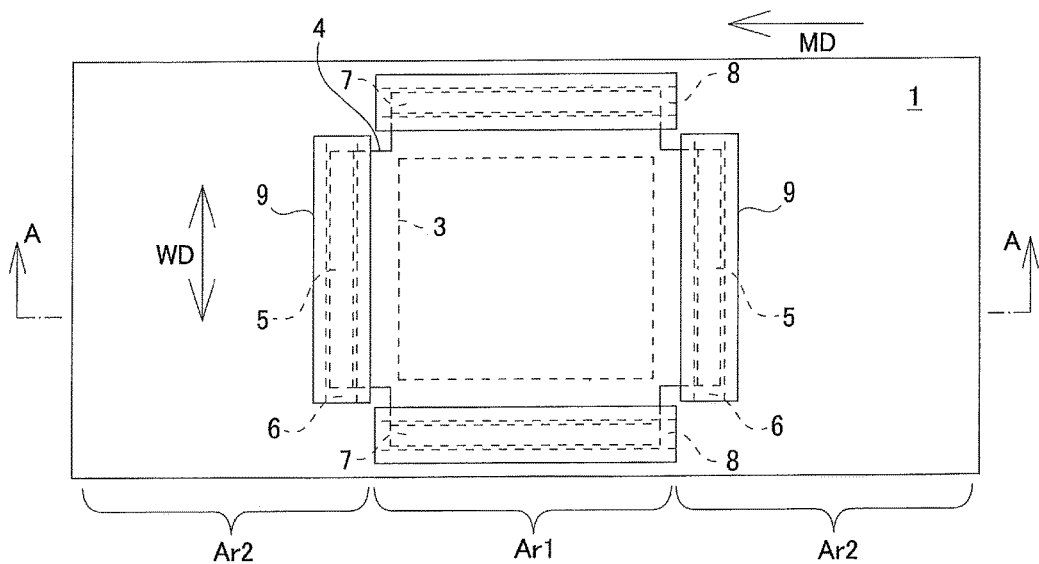
FIG. 2A is a plan view showing the device for measuring the tire ground state according to the first embodiment.
Figure 2B:
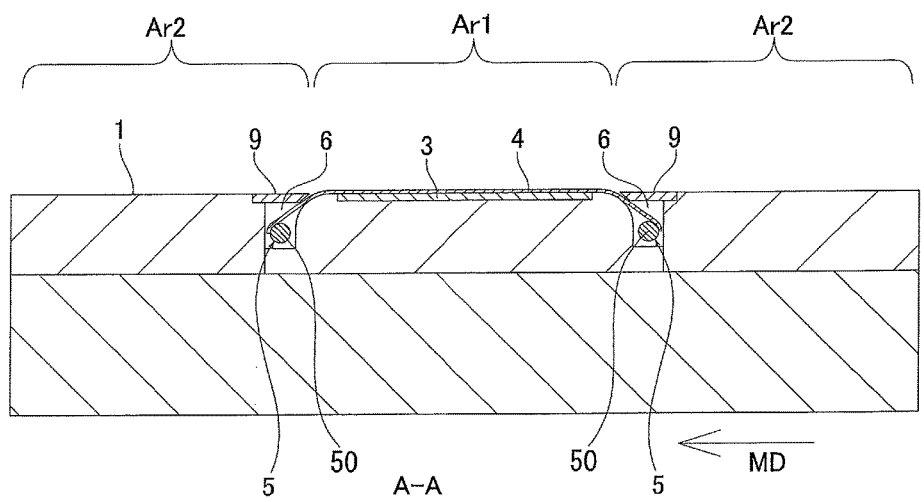
FIG. 2B is a cross sectional view of a position along a line A-A in FIG. 2A.

As shown in FIGS. 1, 2A and 2B, the device for measuring the tire ground state has a traveling surface 1 for allowing a tire T to travel, a tire drive unit 2 which grounds the tire T with the traveling surface 1 and rolls the tire T, a measuring sheet 3 which is mounted to a partial area Ar1 of the traveling surface 1 and is provided for measuring a ground state of the tire T, and a protection sheet 4 which covers the measuring sheet 3.

As shown in FIGS. 2A and 2B, the traveling surface 1 is formed into a rectangular shape in a plan view, and has a measuring area Ar1 and a traveling area Ar2. In the present embodiment, the traveling area Ar2 is set to both sides including a delay side and an advance side of the measuring area Ar1 in a tire forward traveling direction MD, however, is not limited to this. The traveling area Ar2 may be set only to the delay side of the measuring area Ar1 in the tire forward traveling direction MD, and the traveling area Ar2 may be set only to the advance side of the measuring area Ar1 in the tire forward traveling direction MD.

As shown in FIG. 1, the tire drive unit 2 grounds the tire T by pressing the tire T to the traveling surface 1, and rolls the tire T by slidably moving along the tire forward traveling direction MD. In the present embodiment, the tire drive unit 2 slidably moves while making the traveling surface 1 fixed. The traveling surface 1 and the tire drive unit 2 are not limited to the above as long as the traveling surface 1 and the tire drive unit 2 are relatively movable. For example, the traveling surface 1 may be moved while making the tire drive unit 2 fixed.

As shown in FIGS. 2A and 2B, the measuring sheet 3 is mounted and fixed to a partial area (the measuring area Ar1) of the traveling surface 1. In the present embodiment, the measuring sheet 3 is buried in the traveling surface 1 in the measuring area Ar1, thereby making an upper surface of the measuring sheet 3 approximately flush with the traveling surface 1 in the traveling area Ar2. Further, in the present embodiment, the measuring sheet 3 is constructed by a known pressure sensor sheet which outputs an electric signal in correspondence to the pressure, however, is not limited to this. For example, the measuring sheet 3 may be constructed by an imaging sheet which is used in a method of measuring the pressure from an imaged picture image. The sheet has micro projections on a surface thereof, and corresponds to a known measuring method which utilizes the fact that a crushing degree of the micro projections varies in correspondence to the pressure and light and shade are generated in the image in correspondence to the crushing degree of the micro projections.

The protection sheet 4 is provided for protecting the measuring sheet 3, and has a certain degree of strength. The protection sheet 4 is formed into a crisscross shape in a plan view as shown in FIG. 2A. As a material of the protection sheet 4, for example, polycarbonate is listed up, however, the material is not limited to this. A thickness thereof is preferably equal to or less than 0.5 mm.

A space 6 conducting the protection sheet 4 to a portion below the traveling surface 1 is formed in both sides of the measuring sheet 3 in the tire forward traveling direction MD on the traveling surface 1. The space 6 is formed as a groove which extends to be orthogonal to the tire forward traveling direction MD.

The backward and forward tensile force application mechanism 5 applies the tensile force along the tire forward traveling direction MD to the protection sheet 4 by pulling both ends of the protection sheet 4 in the tire forward traveling direction MD from the below of the traveling surface 1. The backward and forward tensile force application mechanism 5 has a roller 50 which is arranged within the space 6. The roller 50 is rotatably supported by a support mechanism (not shown). One end of the protection sheet 4 in the tire forward traveling direction MD is fixed to an outer peripheral surface of the roller 50, and the tensile force can be applied to the protection sheet 4 by rotating the roller 50. At this time, it is possible to adjust magnitude of the tensile force applied to the protection sheet 4 on the basis of an angle of rotation of the roller 50.

The roller 50 is preferably provided with a torque sensor so as to appropriately adjust the tensile force which is applied to the protection sheet 4. The torque of the roller 50 may be adjusted by a torque wrench or the like without provision of the torque sensor. Further, the roller 50 can be rotated by a motor which can be adjusted the torque.

Figure 3:
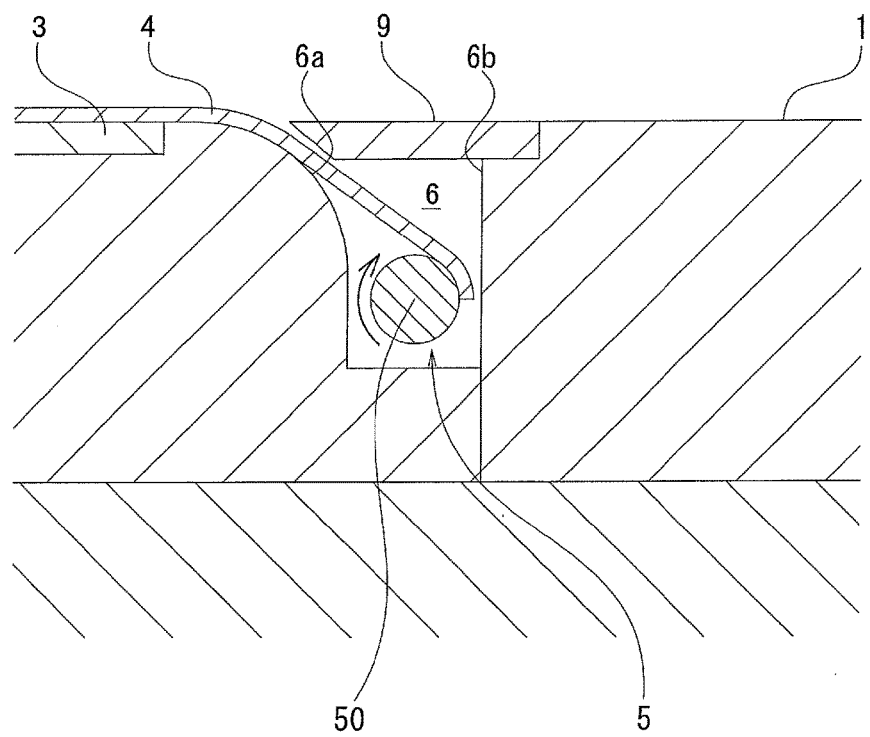
FIG. 3 is an enlarged view of a substantial part of the device for measuring the tire ground state shown in FIG. 2B.

An opening edge 6a facing the measuring sheet 3 in the upper opening of the space 6 is rounded as shown in FIG. 3. In other words, the space 6 is connected to the traveling surface 1 in the measuring area Ar1 to which the measuring sheet 3 is mounted, by a smooth curved surface. As a result, the tensile force can be applied smoothly to the protection sheet 4 when both ends of the protection sheet 4 in the tire forward traveling direction MD are pulled from the below. More specifically, in the case that the opening edge 6a is angulated, the protection sheet 4 is folded and the tensile force can not be suitably applied to the protection sheet 4. However, the folding of the protection sheet 4 can be prevented by rounding the opening edge 6a.

The upper opening of the space 6 is partly closed by an upper lid 9 which is arranged so as to be flush with the traveling surface 1. As a result, it is possible to make a road surface state of the traveling surface 1 uniform. The upper lid 9 is fixed to an opening edge 6b which faces an opening edge 6a of the upper opening. The upper lid 9 is fixed to a concave portion which is formed in the opening edge 6b by a screw or the like (not shown). Further, a small gap is provided between the upper lid 9 and the protection sheet 4, and the upper lid 9 does not inhibit movement of the protection sheet 4.

Further, there is provided a width direction tensile force application mechanism 7 applying the tensile force to the protection sheet 4 in a width direction WD which is orthogonal to the tire forward traveling direction MD. The width direction tensile force application mechanism 7 is structured in the same manner as the backward and forward tensile force application mechanism 5. More specifically, a space 8 conducting the protection sheet 4 to a portion below the traveling surface 1 is formed in both sides of the measuring sheet 3 in the width direction WD on the traveling surface 1, and the width direction tensile force application mechanism 7 is structured such as to pull both ends of the protection sheet 4 in the width direction WD from the below of the traveling surface 1.

Figure 4:
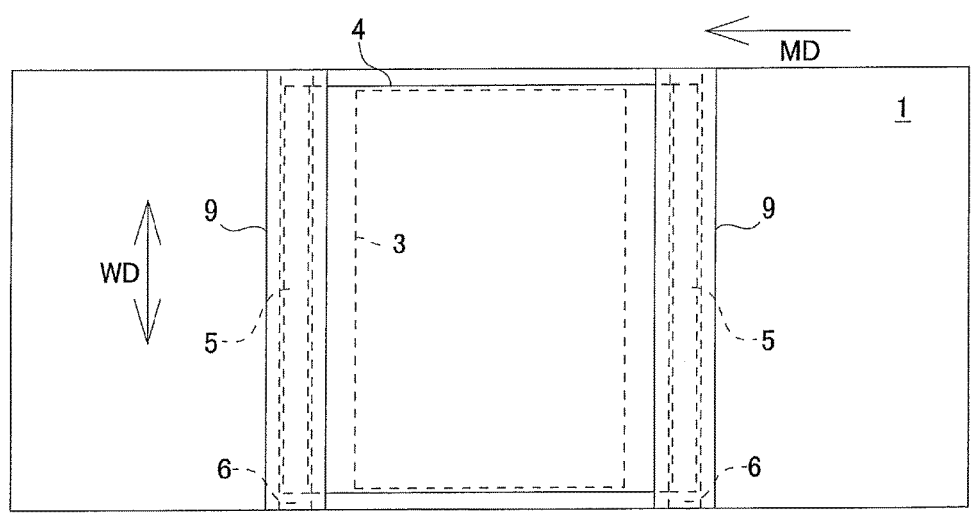
FIG. 4 is a plan view showing a device for measuring a tire ground state according to a second embodiment.

Second Embodiment, Third Embodiment, Fourth Embodiment, Fifth Embodiment and Other Modified Examples The shape of the protection sheet 4 is not limited to the crisscross shape in a plan view (refer to FIG. 2A), but may be formed into a rectangular shape (refer to FIG. 4) or a circular shape in a plan view.

Figure 5:
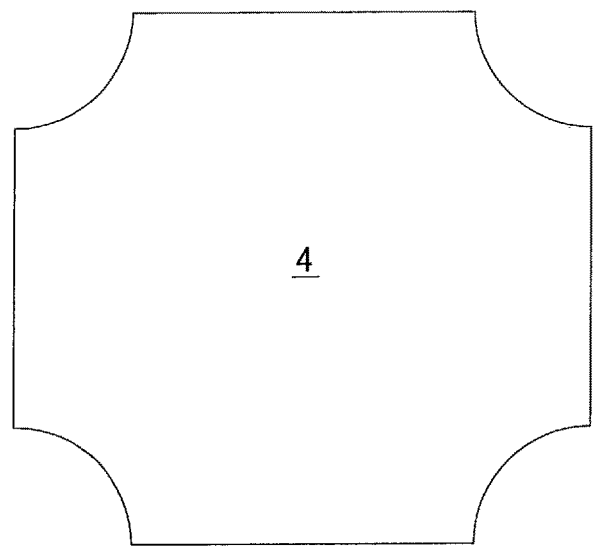
FIG. 5 is a plan view showing a protection sheet according to a third embodiment.

Further, the protection sheet 4 may be formed into a shape obtained by cutting four corners of a rectangular shape into circular arcs such as a third embodiment shown in FIG. 5. Since the shape shown in FIG. 5 can prevent the stress concentration in internal corner portion in comparison with the crisscross shape, the shape can inhibit the protection sheet 4 from being broken.

Further, the width direction tensile force application mechanism 7 may be structured such as to pull along a horizontal direction in the same manner as the conventional one. Further, the width direction tensile force application mechanism may not be provided such as a second embodiment shown in FIG. 4. A shape of the space 6 may be formed into a groove which terminates within the traveling surface 1 such as the first embodiment shown in FIG. 2A, or may be formed into a slit which is open to an end of the traveling surface 1 such as the second embodiment shown in FIG. 4.

Figure 6:
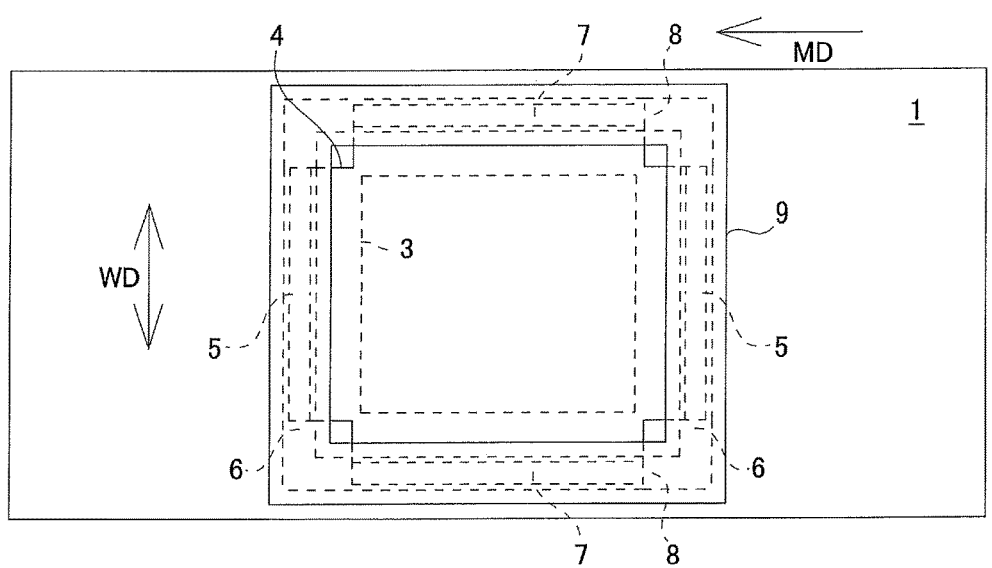
FIG. 6 is a plan view showing a device for measuring a tire ground state according to a fourth embodiment.

Further, the width direction tensile force application mechanism 7 may be formed into a space which is formed into a square shape in a plan view as a whole such as a fourth embodiment shown in FIG. 6, by connecting both ends of the space 6 in the width direction WD and both ends of the space 8 in the tire forward traveling direction MD. At this time, the upper lid 9 is also formed into a square shape.

Figure 7A:
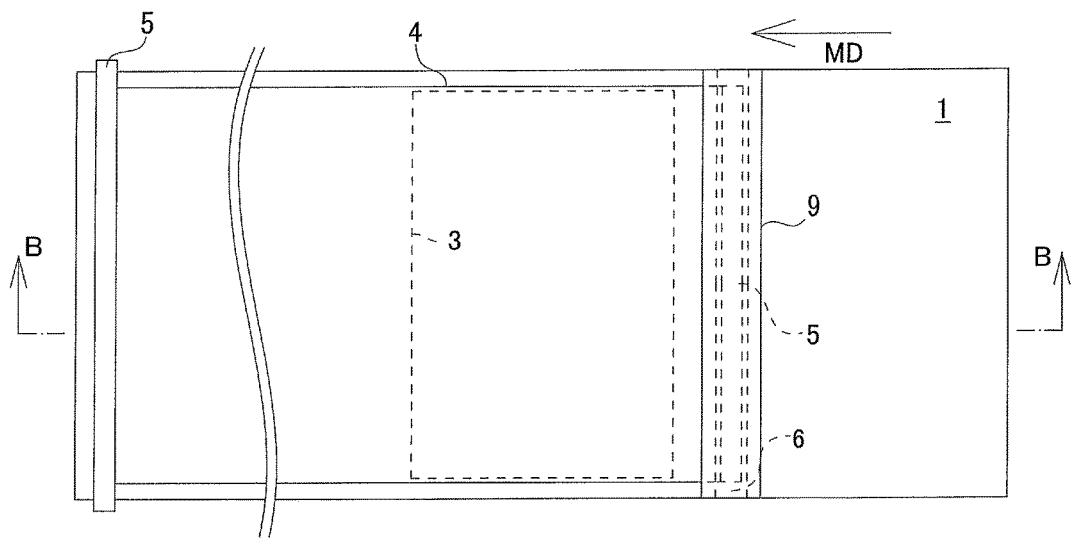
FIG. 7A is a plan view showing a device for measuring a tire ground state according to a fifth embodiment.
Figure 7B:
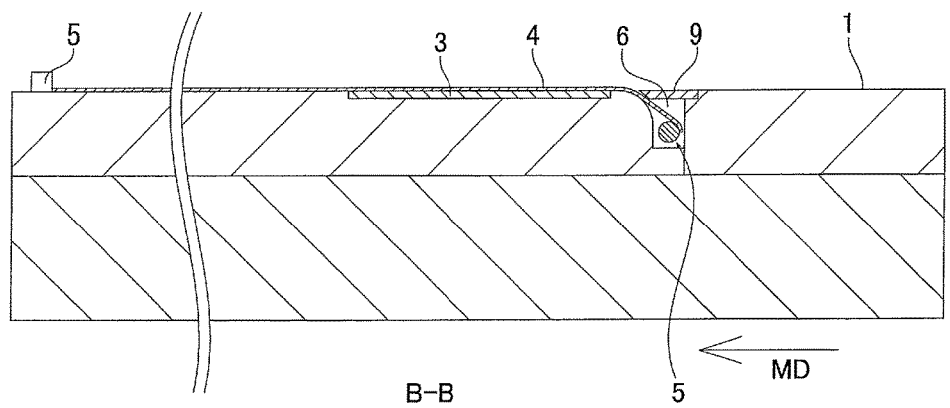
FIG. 7B is a cross sectional view of a position along a line B-B in FIG. 7A.

In the first embodiment (FIGS. 2A and 2B), the second embodiment (FIG. 4) and the fourth embodiment (FIG. 6), the space 6 is formed in both of the delay side and the advance side of the measuring sheet 3 in the tire forward traveling direction MD in the traveling surface 1, however, the space 6 may be formed in only one of them such as a fifth embodiment shown in FIGS. 7A and 7B. In the example in FIGS. 7A and 7B, the space 6 is formed in only the delay side of the measuring sheet 3 in the tire forward traveling direction MD.

As mentioned above, the device for measuring the tire ground state according to the present embodiment includes:
the traveling surface 1;
the tire drive unit 2 which grounds the tire T on the traveling surface 1 and rolls the tire T;
the measuring sheet 3 which is mounted to the partial area Ar1 of the traveling surface 1 and is provided for measuring the ground state of the tire T;
the protection sheet 4 which covers the measuring sheet 3; and
the backward and forward tensile force application mechanism 5 which applies the tensile force along the tire forward traveling direction MD to the protection sheet 4,
the space 6 conducting the protection sheet 4 to the portion below the traveling surface 1 is formed in at least one of the delay side and the advance side of the measuring sheet 3 in the tire forward traveling direction MD on the traveling surface 1, and
the backward and forward tensile force application mechanism 5 has the roller 50 which is arranged within the space 6, and is structured such as to pull at least one end of the protection sheet 4 fixed to the roller 50 in the tire forward traveling direction MD from the below of the traveling surface 1 by rotating the roller 50.

According to the structure, the backward and forward tensile force application mechanism 5 does not interfere with the traveling of the tire T at any of the tire drive starting time and the tire braking time, the protection sheet 4 can be set to the necessarily minimum length and it is possible to downsize the device.

In the present embodiment, the opening edge 6a facing the measuring sheet 3 in the opening edge of the upper opening in the space 6 is rounded.

According to the structure, the tensile force can be smoothly applied to the protection sheet 4 when pulling at least one end of the protection sheet 4 in the tire forward traveling direction MD from the below.

In the present embodiment, the upper opening of the space 6 is partly closed by the upper lid 9 which is arranged so as to be flush with the traveling surface 1.

According to the structure, it is possible to make the road surface state of the traveling surface 1 uniform, and any problem caused by forming the space 6 in the traveling surface 1 is not generated.

The present embodiment is provided with the width direction tensile force application mechanism 7 which applies the tensile force to the protection sheet 4 in the width direction WD which is orthogonal to the tire forward traveling direction MD.

According to the structure, since the tensile force is applied to the protection sheet 4 in the width direction WD, the measuring sheet 3 can be protected by the protection sheet 4 even in the case that the tire T is braked or started driving while being turned.

In the present embodiment, the space 8 conducting the protection sheet 4 to the portion which is below the traveling surface 1 is formed in both sides of the measuring sheet 3 in the width direction WD on the traveling surface 1, and the width direction tensile force application mechanism 7 is structured such as to pull both ends of the protection sheet 4 in the width direction WD from the below of the traveling surface 1.

According to the structure, since the width direction tensile force application mechanism 7 applying the tensile force to the protection sheet 4 in the width direction WD is arranged below the traveling surface 1, it is possible to downsize the device.

The description is given above of the embodiments according to the present invention with reference to the accompanying drawings, however, it should be thought that the specific structures are not limited to these embodiments. The scope of the present invention is defined not only by the description of the above embodiments but also by claims, and further includes all the changes and modifications within the meaning and range which are equivalent to claims.

The structure employed in each of the embodiments mentioned above can be employed in the other optional embodiments. The specific structure of each of the portions is not limited to the embodiments mentioned above, but can be variously modified within the range which does not deviate from the scope of the present invention.

What is claimed is:

1. A device for measuring a tire ground state comprising:
a traveling surface;
a tire drive unit which grounds a tire on the traveling surface and rolls the tire;
a measuring sheet which is mounted to a partial area of the traveling surface and is provided for measuring the tire ground state;
a protection sheet which covers the measuring sheet; and
a backward and forward tensile force application mechanism which applies a tensile force along a tire forward traveling direction to the protection sheet,
wherein a space conducting the protection sheet to a portion below the traveling surface is formed in at least one of a delay side and an advance side of the measuring sheet in the tire forward traveling direction on the traveling surface, and
wherein the backward and forward tensile force application mechanism has a roller which is arranged within the space, and is structured such as to pull at least one end of the protection sheet fixed to the roller in the tire forward traveling direction from the below of the traveling surface by rotating the roller.

2. The device for measuring the tire ground state according to claim 1, wherein an opening edge facing the measuring sheet in opening edges of an upper opening of the space is rounded.

3. The device for measuring the tire ground state according to claim 1, wherein the upper opening of the space is partly closed by an upper lid which is arranged so as to be flush with the traveling surface.

4. The device for measuring the tire ground state according to claim 1, further comprising a width direction tensile force application mechanism which applies to the protection sheet tensile force along a width direction which is orthogonal to the tire forward traveling direction.

5. The device for measuring the tire ground state according to claim 4, wherein a space conducting the protection sheet to a portion below the traveling surface is formed in both sides of the measuring sheet in the width direction on the traveling surface, and the width direction tensile force application mechanism is structured such as to pull both ends of the protection sheet in the width direction from the below of the traveling surface.

6. The device for measuring the tire ground state according to claim 4, wherein the protection sheet is formed into a crisscross shape in a plan view.

7. The device for measuring the tire ground state according to claim 1, wherein the traveling surface has a measuring area and a traveling area, the measuring sheet is buried in the traveling surface in the measuring area, thereby making an upper surface of the measuring sheet approximately flush with the traveling surface in the traveling area.

8. The device for measuring the tire ground state according to claim 1, wherein the space is connected to the traveling surface in the measuring area to which the measuring sheet is mounted, by a smooth curved surface.

9. The device for measuring the tire ground state according to claim 1, wherein the space is formed as a groove which extends to be orthogonal to the tire forward traveling direction.

10. The device for measuring the tire ground state according to claim 1, wherein the protection sheet is made of polycarbonate.

* * * * *